United States Patent
Liang et al.

(10) Patent No.: US 12,492,674 B2
(45) Date of Patent: Dec. 9, 2025

(54) FLOATING OSCILLATING WATER COLUMN-TYPE WAVE ENERGY POWER GENERATION

(71) Applicant: GUANGZHOU INSTITUTE OF ENERGY CONVERSION, CHINESE ACADEMY OF SCIENCES, Guangzhou (CN)

(72) Inventors: Xianguang Liang, Guangzhou (CN); Yaqun Zhang, Guangzhou (CN); Songwei Sheng, Guangzhou (CN); Yin Ye, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 259 days.

(21) Appl. No.: 18/030,081

(22) PCT Filed: Dec. 29, 2020

(86) PCT No.: PCT/CN2020/140465
§ 371 (c)(1),
(2) Date: Apr. 4, 2023

(87) PCT Pub. No.: WO2021/093899
PCT Pub. Date: May 20, 2021

(65) Prior Publication Data
US 2023/0366369 A1  Nov. 16, 2023

(30) Foreign Application Priority Data

Nov. 15, 2019  (CN) .......................... 201911121139.0

(51) Int. Cl.
*F03B 13/24*  (2006.01)
*F03B 11/00*  (2006.01)

(52) U.S. Cl.
CPC ............ *F03B 13/24* (2013.01); *F03B 11/004* (2013.01)

(58) Field of Classification Search
CPC ....... F03B 11/004; F03B 13/142; F03B 13/24
See application file for complete search history.

(56) References Cited

U.S. PATENT DOCUMENTS 3,064,137 A * 11/1962 Corbett, Jr. ........... F03B 13/142
290/54
4,078,382 A * 3/1978 Ricafranca .............. F01D 5/141
60/407

(Continued)

FOREIGN PATENT DOCUMENTS

CN         85201823 U    3/1986
CN         1050922 A     4/1991
(Continued)

OTHER PUBLICATIONS

CN85201823U—English translation (Google Patents) (Year: 1985).*

*Primary Examiner* — Tulsidas C Patel
*Assistant Examiner* — S. Mikailoff
(74) *Attorney, Agent, or Firm* — Bayramoglu Law Offices LLC

(57) ABSTRACT

A floating oscillating water column-type wave energy power generation apparatus includes a first runner chamber and a protective cap, wherein a nozzle is mounted inside the first runner chamber, a flow-guiding cone is coaxially mounted below the nozzle, the flow-guiding cone is conical and arranged with a tip facing down; an impeller is coaxially mounted above the nozzle; a power generator is coaxially mounted above the impeller; the protective cap is mounted at the top of the first runner chamber; and a gap is provided between an edge of the protective cap and an edge of the first runner chamber for air circulation. According to the floating oscillating water column-type wave energy power genera- (Continued)

tion apparatus, as the nozzle with the flow-guiding cone structure is used, the flow-guiding cone can guide air flowing, and increase the air flowing speed in the apparatus.

3 Claims, 2 Drawing Sheets

(56) References Cited

U.S. PATENT DOCUMENTS

| | | | | |
|---|---|---|---|---|
| 4,198,821 | A * | 4/1980 | Moody | F03B 13/142 417/100 |
| 4,286,347 | A * | 9/1981 | Modisette | F03B 13/142 60/398 |
| 4,719,754 | A * | 1/1988 | Nishikawa | F03B 13/142 417/100 |
| 5,005,357 | A * | 4/1991 | Fox | F03B 13/142 60/495 |
| 11,585,315 | B2 * | 2/2023 | Ning | F03B 17/00 |
| 2015/0135696 | A1 * | 5/2015 | Becker | F03B 13/24 415/17 |
| 2019/0203689 | A1 * | 7/2019 | Sheldon-Coulson | H02K 7/183 |

FOREIGN PATENT DOCUMENTS

| | | |
|---|---|---|
| CN | 110406635 A | 11/2019 |
| CN | 110966134 A | 4/2020 |
| CN | 211549887 U | 9/2020 |
| JP | S50112830 U | 9/1975 |
| JP | S5857082 A | 4/1983 |
| JP | S6345076 U | 3/1988 |

* cited by examiner

FLOATING OSCILLATING WATER COLUMN-TYPE WAVE ENERGY POWER GENERATION

CROSS REFERENCE TO THE RELATED APPLICATIONS

This application is the national phase entry of International Application No. PCT/CN2020/140465, filed on Dec. 29, 2020, which is based upon and claims priority to Chinese Patent Application No. 201911121139.0, filed on Nov. 15, 2019, the entire contents of which are incorporated herein by reference.

TECHNICAL FIELD

The present invention relates to the technical field of marine renewable energy utilization, and in particular to a floating oscillating water column-type wave energy power generation apparatus capable of generating power with wave energy.

BACKGROUND

The ocean covers about 71% of the earth's surface area, and contains abundant wave energy, which is the most unstable energy in ocean energy, but is widely distributed and easy to exploit and utilize on a large scale as clean renewable energy, and is mainly used for power generation, desalination of seawater, provision of power for other offshore devices and the like. The development and utilization of wave energy is an important direction in the field of renewable energy research in various countries. In particular, some coastal countries have invested a lot of money in researching various wave energy conversion and utilization apparatuses, making a great contribution to the development of wave energy utilization technologies.

There are many types of wave energy utilization technologies which are classified according to various methods. According to different working principles, the wave energy utilization technologies mainly include an oscillating buoy technology, an overtopping technology, and an oscillating water column technology. For the oscillating buoy technology, two or more structures are used to perform relative motion under the action of waves to convert wave energy to mechanical energy of the structures, and then a hydraulic system or a mechanical structure is connected to drive a power generation apparatus to generate electricity, or a linear motor is directly used to directly convert wave energy to electricity. However, such an apparatus has a low material utilization rate (two or more floating bodies), cannot avoid collision between the floating bodies, has a long launch time (floating state adjustment requires time and devices), a complex structure, a large volume of an apparatus base and cannot be disassembled, and is limited by technologies in terms of improvement on cost performance. For the overtopping technology, the climbing characteristic of waves is mainly used, the waves are introduced into high-level reservoirs as water channels narrow to convert wave energy to potential energy to generate electricity by a water turbine. Such an apparatus has a solid structure and a large scale because its generating capacity depends on the weight of a conversion carrier, is complex in design of a mooring system, greatly impacted by marine organism attachment, high in cost and inconvenient in maintenance. For the oscillating water column technology, air is used as a working medium, a reciprocating oscillating water column pushes, like a piston, the air in an air chamber to reciprocate to pass through a nozzle, and the reciprocating airflow drives the air turbine to rotate to drive a power generator to generate electricity. Such an apparatus has the characteristics of a single floating body, a high material utilization rate, and no collision, and will not be affected by marine organisms since the turbine and the power generator are located on the water surface, but is complex in structure, large in volume and inconvenient to disassemble, assemble and replace, resulting in poor compatibility with small offshore apparatuses such as buoys.

SUMMARY

An object of the present invention is to overcome the above defects of the prior art, and provide a floating oscillating water column-type wave energy power generation apparatus which is simple in structure, low in manufacturing cost and high in maintainability and less affected by marine organism attachment, and has high reliability and high conversion efficiency.

In order to achieve the above object, the present invention adopts the following technical solution.

A floating oscillating water column-type wave energy power generation apparatus includes a first runner chamber and a protective cap. A nozzle is mounted inside the first runner chamber, a flow-guiding cone is coaxially mounted below the nozzle, and the flow-guiding cone is conical and arranged with a tip facing down. An impeller is coaxially mounted above the nozzle. A power generator is coaxially mounted above the impeller. The protective cap is mounted at the top of the first runner chamber and a gap is provided between an edge of the protective cap and an edge of the first runner chamber for air circulation.

As an improvement of the present invention, the first runner chamber is of a cylindrical structure, hollow and provided with a plurality of inwards opened/closed circular air valves on a hub structure thereof.

As an improvement of the present invention, the protective cap is of a semi-spherical shell structure and buckled on an outer circumferential edge of the first runner chamber with a spherical surface facing upwards.

As an improvement of the present invention, a plurality of air-permeable holes are uniformly formed in the spherical surface of the protective cap.

As an improvement of the present invention, a color marking layer is sprayed on the spherical surface of the protective cap.

As an improvement of the present invention, the nozzle is disposed above the circular air valve, of a disc structure in the middle and a ring structure on the outside, and flowing-guide vanes are distributed radially and equidistantly between the two structures with the axis as the center.

As an improvement of the present invention, a controller is mounted above the power generator, and has the same size as that of the power generator.

As an improvement of the present invention, a second runner chamber is further mounted under the first runner chamber and communicated with the first runner chamber in a vertical direction.

As an improvement of the present invention, the second runner chamber is of a structure of a rectangular parallelepiped or a cube, hollow and provided with an inwardly opened/closed rectangular air valve on each of side faces thereof.

Compared with the prior art, the present invention has the following advantages.

1. As the nozzle with the flow-guiding cone structure is used, the flow-guiding cone can guide air flowing, and increase the flowing speed of air in the apparatus and the wave upsurging within the runner chamber can be reduced, the components within the apparatus can be protected.
2. As the protective cap is designed, the components such as the power generator and the controller in the apparatus can be effectively protected from the erosion of rainwater and sea air, thereby prolonging the service life. The surface of the protective cap can also be sprayed with a warning color to play a role in warning and identification.
3. The power generator and the controller are integrally designed and mounted. The integrated design can not only save the internal space of the apparatus as much as possible, reduce the cable layout, realize sealing, but also can dissipate heat of the power generator and the nozzle by using wind flowing from the impeller.
4. As the multi-runner chamber design is used, different output power can be achieved by using different runner chambers according to different sea conditions. The cylindrical runner chamber and the cuboid runner chamber can be used alone or together. In the case of low power output, the cylindrical runner chamber is used. In the case of high-power output, the cylindrical runner chamber and the cuboid runner chamber are used together. In the case of power between the low power and the high power, the cuboid runner chamber is used. When the two kinds of runner chambers are used together, the air valve of the cylindrical runner chamber is closed, and only the valve of the cuboid runner chamber is used as an air replenishing port.

DETAILED DESCRIPTION OF THE EMBODIMENTS

In order to make the above object, features and advantages of the present invention more apparent and understandable, the present invention will be further explained in detail below with reference to the accompanying drawings and embodiments.

Embodiment 1

Figure 1:
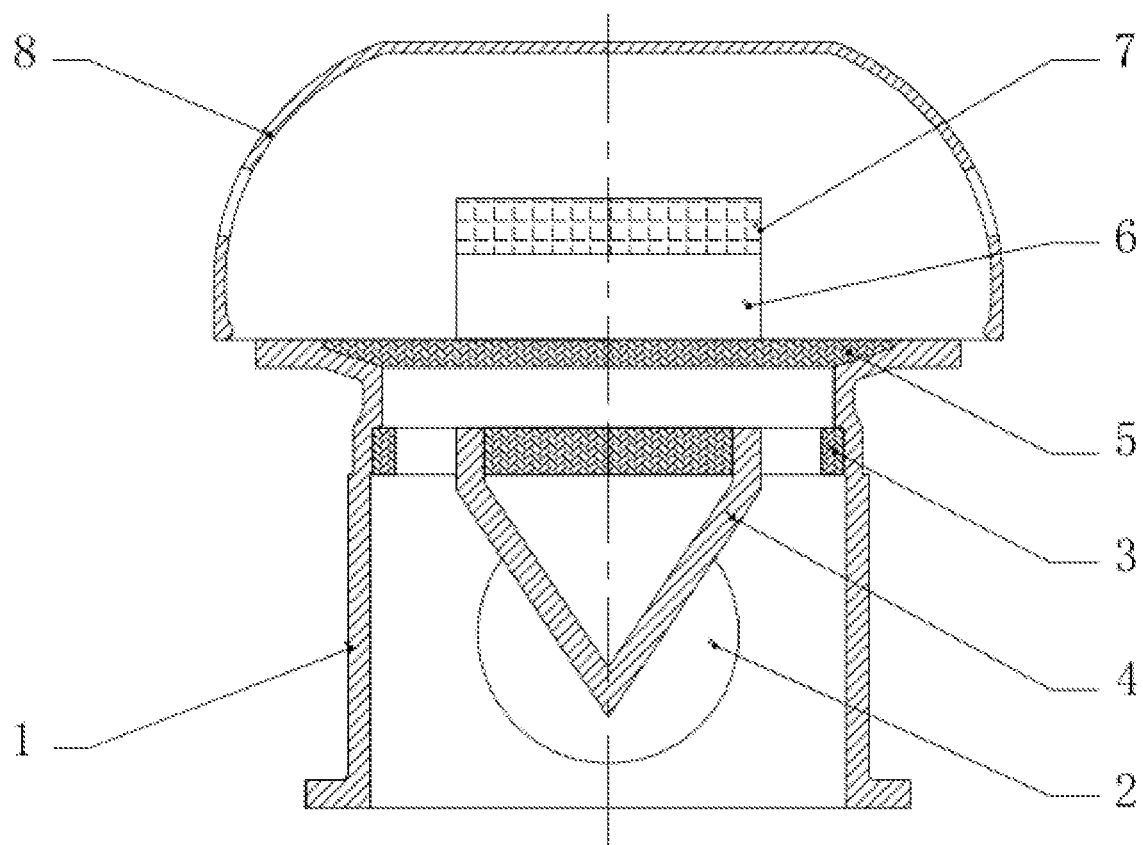
FIG. 1 is a structural schematic diagram of a first embodiment of the present invention.
Figure 2:
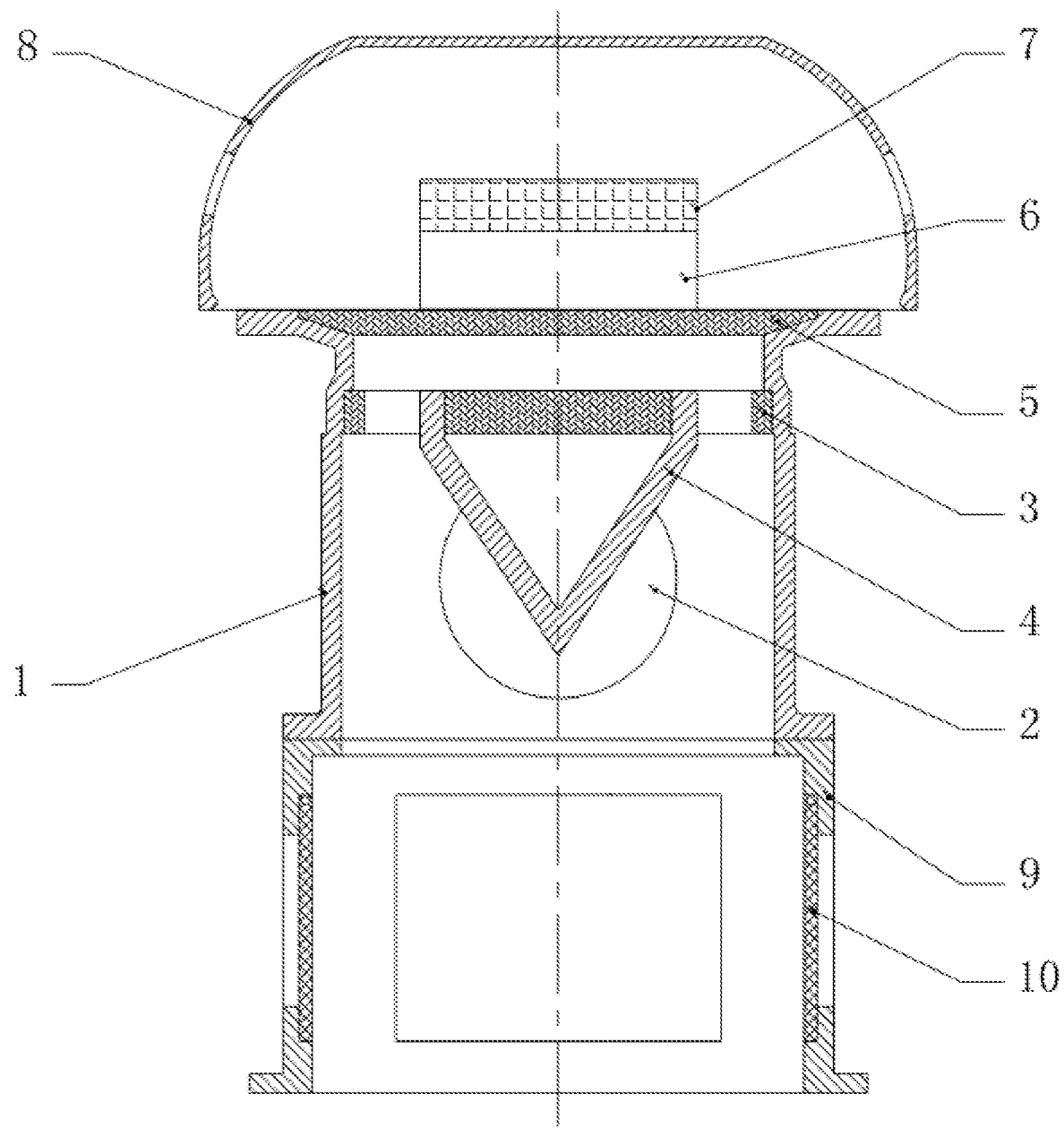
FIG. 2 is a structural schematic diagram of a second embodiment of the present invention.
Reference signs in the figures: 1—first runner chamber; 2—circular air valve; 3—nozzle; 4—flow-guiding cone; 5—impeller; 6—power generator; 7—controller; 8—protective cap; 9—second runner chamber; and 10—rectangular air valve.

As shown in FIG. 1, a floating oscillating water column-type wave energy power generation apparatus includes a first runner chamber 1, a nozzle 3, a flow-guiding cone 4, an impeller 5, a power generator 6, a controller 7 and a protective cap 8.
The first runner chamber 1 is of a cylindrical structure, hollow and provided with a plurality of circular air valves 2 on a hub structure thereof. The circular air valve 2 is composed of a valve frame and a valve, and the valve may be made of a soft material such as a rubber sheet and mounted at the top of valve frame, can only be opened/closed inwards, and is used to replenish air when negative pressure occurs inside the first runner chamber 1. A specific opening and closing structure can use a conventional hinge method, which will not be repeated here.
The nozzle 3 is mounted at the middle-upper part of the first runner chamber 1, disposed above the circular air valve 2, and used to push rapidly air pressed into the first runner chamber 1 to the impeller 5. The nozzle 3 is of a disc structure in the middle and of a ring structure on the outside, and flowing-guide vanes are distributed radially and equidistantly between the two structures with the axis as the center. The flowing-guide vanes are of an irregular shape specially designed, which can increase the air flowing speed and change the air flowing direction.
A flow-guiding cone 4 is coaxially mounted below the nozzle 3, composed of a cylinder and a cone, which are coaxial, and mounted in such a manner that a tip of the cone faces down. The flow-guiding cone can guide air flowing, increase the air flowing speed in the apparatus, and reduce wave upsurging within the runner chamber, thereby protecting components within the apparatus.
An impeller 5 is coaxially mounted above the nozzle 3 and vanes of the impeller 5 are distributed radially and uniformly with the axis as the centre. The vane takes a specially designed shape, which can allow air to flow quickly and reduce air resistance. A cylindrical power generator 6 is coaxially mounted above the impeller 5, and has a diameter smaller than that of the first runner chamber 1, and a stator and a rotor of the power generator are mounted in the first runner chamber 1. A controller 7 has the same size as that of the power generator 6, and is mounted directly above the power generator 6. The power generator 6 and the controller 7 are integrated. The integrated design can not only save the internal space of the apparatus as much as possible, reduce the cable layout, achieve sealing, but also can dissipate heat of the power generator and the controller 7 by using wind flowing from the impeller.
The protective cap 8 is similar to a semisphere and is buckled on an outer circumferential edge of the first runner chamber 1 with a spherical surface facing upwards. Specifically, a plurality of mounting bosses radially protrude from the outer circumferential edge of the first runner chamber 1. The protective cap 8 is fixed to the boss through a bolt, so that a gap for air circulation is formed between the protective cap 8 and the outer circumferential edge of the first runner chamber 1. In order to accelerate the air circulation, air-permeable holes may also be formed in the spherical surface of the protective cap 8, and rubber sleeves or rubber plugs are disposed at the air-permeable holes. The air-permeable holes may be plugged when not in use. The design of the protective cap 8 can effectively protect the components such as the power generator 6 and the controller 7 in the protective cap 8 from the erosion of rainwater and sea air, thereby prolonging the service life. The surface of the protective cap 8 may also be sprayed with a warning color, preferably red, which can play a role in warning and identification.
The working principle of the floating oscillating water column-type wave energy power generation apparatus of the present invention is as follows.
The floating oscillating water column-type wave energy power generation apparatus is mounted on a buoy with an air channel, and for example, referring to the inventor's prior application (CN 110406635A Multi-stage power supply power buoy with a central pipe), the floating oscillating water column-type wave energy power generation apparatus is communicated with the central pipe through a flange.

Under the action of waves, the entire buoy moves vertically repeatedly, so that a water column in the central pipe performs relative oscillating motion in the pipe. Equivalent to a piston, the oscillating water column pushes air in the central pipe to reciprocate, so that the air in an air chamber obtains kinetic energy, and the moving air pushes the impeller 5 to rotate through the nozzle 3 inside the floating oscillating water column-type wave energy power generation apparatus, thereby driving the power generator 6 to generate electricity. The generated electricity is provided for an electrical device on the buoy through the controller 7 on the one hand, and stored in a storage battery on the other hand.

Embodiment 2

On the basis of embodiment 1, a second runner chamber 9 is added. Specifically, the second runner chamber 9 is mounted under the first runner chamber 1 and the sealing between first runner chamber 1 and the second runner chamber 9 is achieved through rubber. The second runner chamber 9 is of a structure of a rectangular parallelepiped or a cube and hollow inside. A rectangular air valve 10 is disposed at a centre position of each of vertical surfaces of the cuboid runner chamber 9. The rectangular air valve 10 is composed of a valve frame and a valve and the valve is made of a soft material and mounted at the top of valve frame, and can only be opened/closed inwards. A specific structure of the rectangular air valve 10 is the same as that of the circular air valve 2.

It should be noted that although in Embodiment 1, the cylindrical runner chamber is used, it can be replaced with the cuboid runner chamber of Embodiment 2 through simple design. In this way, the floating oscillating water column-type wave energy power generation apparatus according to the present invention can use different runner chambers according to different sea conditions to achieve different output power. The first runner chamber 1 and the second runner chamber 9 can be used alone or together. In the case of low power output, the cylindrical runner chamber is used. In the case of high power output, the cylindrical runner chamber and the cuboid runner chamber are used together. In the case of power between low power and high power, the cuboid runner chamber is used. When the two kinds of runner chambers are used together, the circular air valve 2 of the first runner chamber 1 is closed, and only the rectangular air valve 10 of the second runner chamber 9 is used as an air replenishing port.

The above embodiments are merely for describing the technical concept and features of the present invention, their object is that those of ordinary skill in the art could understand the content of the present invention and implement therefrom, and limitation to the scope of protection of the present invention cannot be made only by these embodiments. All equivalent changes or modifications made in accordance with the spirit of the present invention should be within the scope of protection of the present invention.

What is claimed is:

1. A floating oscillating water column-type wave energy power generation apparatus, comprising a first chamber and a protective cap,
   wherein a nozzle is mounted inside the first chamber;
   a flow-guiding cone is coaxially mounted below the nozzle with respect to a direction of gravity, and the flow-guiding cone is conical and arranged with a tip facing down with respect to said direction of gravity;
   an impeller is coaxially mounted above the nozzle with respect to said direction of gravity;
   a power generator is coaxially mounted above the impeller with respect to said direction of gravity;
   wherein the protective cap is mounted at a top of the first chamber;
   wherein a gap is provided between an edge of the protective cap and an outer circumferential edge of the first chamber for air circulation,
   wherein the protective cap is a semi-spherical shell structure and is disposed on the outer circumferential edge of the first chamber with a spherical surface of the semi-spherical shell structure of the protective cap facing upwards with respect to said direction of gravity;
   wherein the protective cap is uniformly provided with a plurality of air-permeable holes on the spherical surface;
   wherein the nozzle includes a disc structure in a middle of the nozzle and a ring structure at a periphery of the nozzle, and the nozzle includes flowing-guide vanes arranged such that the flowing-guide vanes are distributed radially and equidistantly between the disc structure and the ring structure, wherein the flowing-guide vanes are arranged such that an axis of the flowing-guide vanes is disposed at a center of the flowing-guide vanes; and
   wherein a second chamber is mounted under the first chamber and communicate s with the first chamber in the direction of gravity,
   wherein the first chamber is a cylindrical structure, is hollow and is provided with a plurality of circular air valves, wherein the tip of the flow-guiding cone is disposed at a same height as at least a portion of the plurality of circular air valves with respect to said direction of gravity such that the tip of the flow-guiding cone is enclosed between the plurality of circular air valves.

2. The floating oscillating water column-type wave energy power generation apparatus according to claim 1, wherein the nozzle is disposed above the plurality of circular air valves with respect to said direction of gravity.

3. The floating oscillating water column-type wave energy power generation apparatus according to claim 1, wherein the second chamber comprises side faces and wherein the second chamber is a rectangular parallelepiped structure or a cube structure, is hollow and is provided with a rectangular air valve on each side face of the side faces of the second chamber.

* * * * *